US012291969B2

(12) United States Patent
Pastorino

(10) Patent No.: US 12,291,969 B2
(45) Date of Patent: May 6, 2025

(54) TWO-PART RESIN INPUT NOZZLE

(71) Applicant: INNOVATIVE MINING PRODUCTS (PTY) LTD, Johannesburg (ZA)

(72) Inventor: Paolo Ettore Pastorino, Cape Town (ZA)

(73) Assignee: INNOVATIVE MINING PRODUCTS (PTY) LTD, Johannesburg (ZA)

( * ) Notice: Subject to any disclaimer, the term of this patent is extended or adjusted under 35 U.S.C. 154(b) by 0 days.

(21) Appl. No.: 17/924,901

(22) PCT Filed: May 6, 2021

(86) PCT No.: PCT/ZA2021/050028

§ 371 (c)(1),
(2) Date: Nov. 11, 2022

(87) PCT Pub. No.: WO2021/232073

PCT Pub. Date: Nov. 18, 2021

(65) Prior Publication Data

US 2023/0349294 A1 Nov. 2, 2023

(51) Int. Cl.
*E21D 20/02* (2006.01)
*B05C 7/04* (2006.01)
(Continued)

(52) U.S. Cl.
CPC .............. *E21D 20/025* (2013.01); *B05C 7/04* (2013.01); *E21D 20/028* (2013.01)

(58) Field of Classification Search
CPC ....... E21D 20/028; E21D 20/00; E21D 20/02; E21D 20/025; E21D 21/0093; B05C 7/04
See application file for complete search history.

(56) References Cited

U.S. PATENT DOCUMENTS

2007/0264088 A1* 11/2007 Richter ................. E21D 20/025 405/259.5
2015/0322785 A1* 11/2015 Ahola ................. E21D 21/0033 405/259.5

(Continued)

FOREIGN PATENT DOCUMENTS

AU 2010201306 A1 * 10/2010 ........... E21D 20/028
CA 2713194 7/2009

(Continued)

OTHER PUBLICATIONS

International Search Report for PCT/ZA2021/050028, mailed Sep. 14, 2021, 5 pages.

(Continued)

*Primary Examiner* — Frederick L Lagman
*Assistant Examiner* — Stacy N Lawson
(74) *Attorney, Agent, or Firm* — NIXON & VANDERHYE

(57) ABSTRACT

A resin input nozzle (10A) which is adapted to engage or connect to a hollow resin-anchored rock bolt (12) to introduce a resin composed of a plurality of resin components (A,B,C), into and through the bolt, the nozzle including a body (14) with a leading end (16), a leading end portion which ends at a leading end and a trailing end (18), a first conduit (22) and a second conduit (24) formed through the body, each conduit having an outlet (28A, 28B), which opens at or adjacent the leading end, and at least one inlet (26A, 26B) which is adapted to engage with a supply of a respective resin component, wherein the outlets are spaced from one another to prevent mixing of the resin components as each emerges from a respective outlet after passage through a respective conduit.

6 Claims, 4 Drawing Sheets

(51) Int. Cl.

| | |
|---|---|
| ***E21D 20/00*** | (2006.01) |
| ***E21D 21/00*** | (2006.01) |

(56) References Cited

U.S. PATENT DOCUMENTS

| | | | | |
|---|---|---|---|---|
| 2016/0130778 | A1* | 5/2016 | Levey | E02D 5/801 405/259.1 |
| 2018/0066519 | A1 | 3/2018 | Faulkner et al. | |
| 2021/0071525 | A1* | 3/2021 | Cawood | E21D 21/0026 |
| 2022/0120182 | A1* | 4/2022 | Roberts | E21D 20/028 |

FOREIGN PATENT DOCUMENTS

| | | | | |
|---|---|---|---|---|
| CA | 2999569 | | | 9/2019 |
| CN | 115614077 | A | * | 1/2023 |
| DE | 3100730 | | | 12/1981 |
| WO | 2007095690 | | | 8/2007 |
| WO | 2014190382 | | | 12/2014 |
| WO | 2020247987 | | | 12/2020 |

OTHER PUBLICATIONS

Written Opinion of the ISA for PCT/ZA2021/050028, mailed Sep. 14, 2021.

* cited by examiner

TWO-PART RESIN INPUT NOZZLE

CROSS-REFERENCE TO RELATED APPLICATIONS

This application is the U.S. national phase of International Application No. PCT/ZA2021/050028 filed May 12, 2020, which designated the U.S. and claims priority to ZA Patent Application No. 2020/02631 filed May 12, 2020, the entire contents of each of which are hereby incorporated by reference.

FIELD OF THE INVENTION

The invention relates to a nozzle adapted to engage a hollow rock bolt to provide for the introduction of a two-part resin into and through the rock bolt so that the rock bolt can adhere within a rock hole into which bolt is inserted.

BACKGROUND OF THE INVENTION

Bonding agents, and support systems generally, are evolving from the typical rock bolt and cementitious grout applications of the past.

The prior art teaches a grout delivery system (MP1) which is described in a specification to PCT/ZA2016/000017. This rock bolt assembly of this system has a rock bolt, partially located within a sleeve, which is preloaded before a grout material is introduced. The assembly has a barrel with an inlet aperture which communicates with a grout channel comprised of an interior of the barrel and the sleeve. A grout nozzle docks with the barrel. The nozzle has a circumferential grout distributing channel to ensure that, irrespective of the radial orientation of the grout outlet port of the nozzle relatively to the aperture, the grout can enter the aperture, by circulating about the channel.

With quick setting two-part bonding agents (resin), used with such support systems, the above configuration or similar cannot be used, not least of all because the resin tends to set from a mix point. The distributing channel, as an integral part of the nozzle, is downstream of the mix point. The nozzle therefore will clog with setting resin, preventing easy reuse and resulting in equipment downtime whilst clogged equipment is cleaned or replaced. The same problem occurs with use of conventional cementitious grouts where setting grout builds up over successive installations within ports and channels of the nozzle.

A solution to this problem includes providing a means to flush the delivery hoses of the two resin components and the filler nozzle with a grease or other lubricant after pumping of the resin into the bolt is complete. This solution brings complexity, and cost, to the grout delivery system.

Hereinafter, reference to "resin" is reference to any adhesive material that is introduced into the rock hole to adhere the rock bolt within the rock hole.

The invention at least partially sources the aforementioned problem.

SUMMARY OF INVENTION

A resin input nozzle which is adapted to engage or connect to a hollow resin-anchored rock bolt to introduce a resin composed of a plurality of resin components, into and through the bolt, the nozzle including a body with a leading end, a leading end portion which ends at a leading end and a trailing end, a first conduit and a second conduit formed through the body, each conduit having an outlet, which opens at or adjacent the leading end, and at least one inlet which is adapted to engage with a supply of a respective resin component, wherein the outlets are spaced from one another to prevent mixing of the resin components as each emerges from a respective outlet after passage through a respective conduit.

The body may be adapted along the leading end portion to sealingly engage or connect to the rock bolt.

The body may include a sealing formation engaged with the leading end portion. The sealing formation may be an O-ring seal.

The first conduit and the second conduit may be concentrically arranged, with the first conduit within the second conduit.

The first conduit may extend beyond the second conduit, at the leading end, to axially space the outlet of the first conduit from the outlet of the second conduit.

The inlet to the second conduit may laterally extend from a side-wall of the body of the nozzle.

Within the second conduit, the nozzle may include an axially aligned wall which divides the second conduit into a first portion and a second portion, each portion having an inlet which is adapted to engage with a supply of a resin component or a flushing medium.

The inlets to the first portion and the second portion of the second conduit may each laterally extend from a side-wall of the body of the nozzle.

Alternatively, the first conduit and the second conduit may be separate from one another.

The conduits may diverge from one another, at least towards the leading end, with each outlet opening through a side-wall of the body, to radially space the outlet of the first conduit from the outlet of the second conduit.

The inlet of each conduit may open at the trailing end.

The invention extends to a resin input nozzle kit which includes the nozzle described above and an adapter which has a forward end, which is adapted to engage with an end of the rock bolt, and a rear end which is adapted to sealingly engage with the leading end portion of the nozzle body.

The adapter may have a receptacle recessed in the rear end that is complementarily shaped to receive the leading end portion of the nozzle in sealing engagement.

The adapter may have a passage which leads from the receptacle, opening at the forward end.

Within the receptacle, the adapter may have a reservoir into which the resin components are delivered before flowing into the passage.

The invention further provides a rock bolt assembly which includes a rock bolt which has an elongate body with a distal end and a proximal end, a bore which extends the length of the body, opening at the distal and proximal ends, an annular reservoir recessed in a wall of the bore; and a resin nozzle for introducing a multi-component resin into and through the rock bolt, which nozzle has a body with a leading end and a trailing end, a first conduit and a second conduit formed through the body, each conduit having an outlet, which opens at or adjacent the leading end, and at least one inlet which is adapted to engage with a supply of a respective resin component; wherein the first conduit and the second conduit are separate and divergent, at least towards the leading end, with each outlet opening through a side-wall of the body, to radially space the outlet of the first conduit from the outlet of the second conduit; and wherein the reservoir is positioned to receive each resin component as each emerges from a respective outlet after the nozzle is inserted into the bore of the rock bolt from proximal end.

BRIEF DESCRIPTION OF THE DRAWINGS

The invention is further described by way of examples with reference to the accompanying drawings in which.

DESCRIPTION OF PREFERRED EMBODIMENTS

Figure 1:
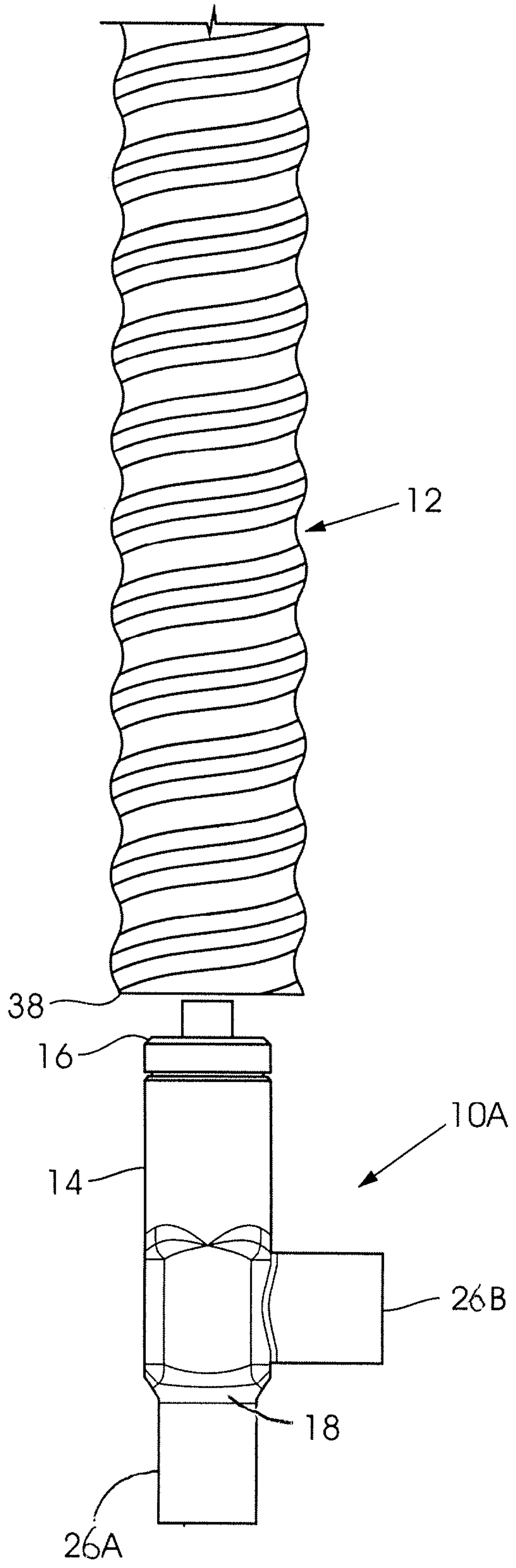
FIG. 1 is a view in elevation of a resin anchored rock bolt and a resin input nozzle in accordance with the invention.
Figure 2:
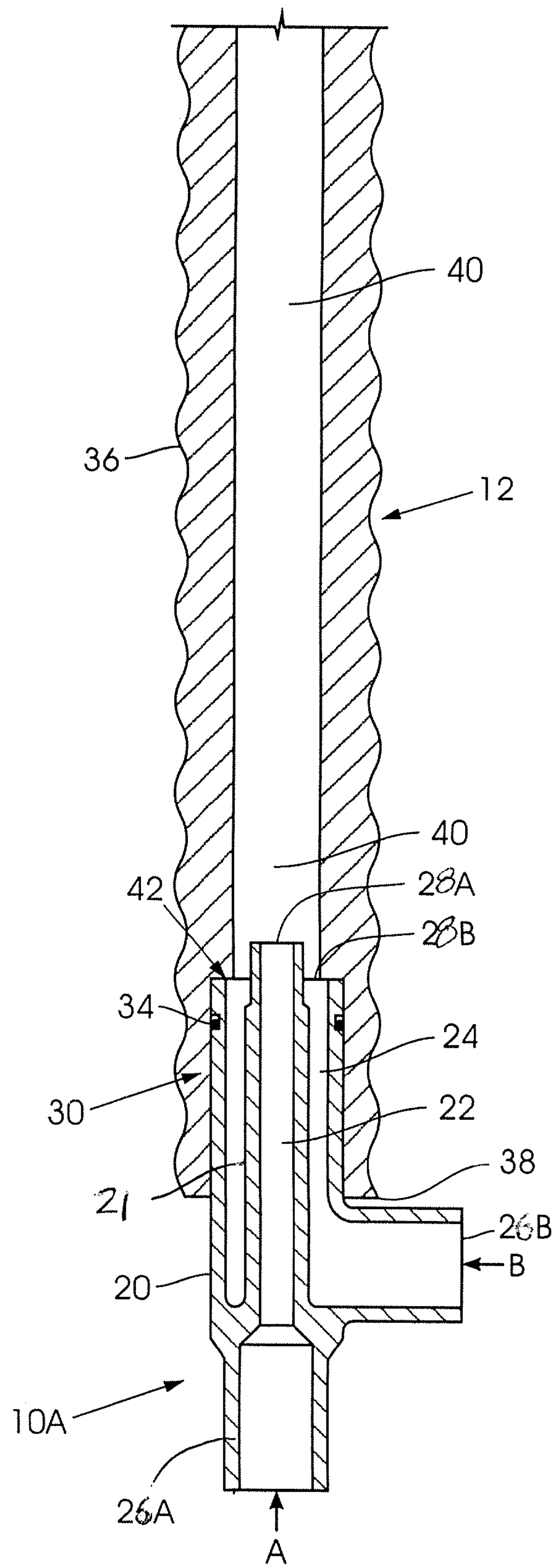
FIG. 2 is a view in longitudinal section of the nozzle engaged with the rock bolt.

Referring to FIGS. 1 and 2 of the accompanying drawings, an internal resin-input nozzle 10A is provided in accordance with a first embodiment of the invention.

The nozzle 10A is sealingly engageable with a hollow resin-anchored rock bolt 12 as illustrated in FIG. 2.

The nozzle 10A has a cylindrical body 14, made of a suitable metal, plastics or composite material, which extends, in the axial direction of the rock bolt in use, between a leading end 16 and a trailing end 18. Between the ends, the body comprises a cylindrical outer wall 20 and a cylindrical inner wall 21.

Within the inner wall 21 and between the outer wall 20 and the inner wall, a first conduit 22 and a second conduit 24 respectively are concentrically defined.

A respective inlet (respectively designated 26A and 26B) opens into the conduits and each conduit opens out at a respective outlet (respectively designated 28A and 28B). The inlet 26A to the first conduit 22 protrudes from the trailing end 18 of the nozzle body in the axial direction whereas the inlet 26B to the second conduit 24 extends laterally from the outer wall 20.

The outlet 28B opens at the leading end 16. However, the outlet 28A opens above outlet 28B as the first conduit 22 protrudes slightly relatively to the second conduit 24. This axial spacing of the outlets provides space into which the respective resin components can exit before making contact and mixing, delaying the setting of the resin to further along the resin stream. The benefit is that the mixed resin does not harden near the outlets, thus preventing occlusion.

A leading end portion 30 of the nozzle body, defined from the leading end 16 to a depth at which the body inserts into a rock bolt 12 in use, is adapted for sealing engagement with the rock bolt. In this example, the portion 30 is adapted with an O-ring seal 34 which seats within an annular groove formed in the outer surface of the outer wall 20.

Prior to use, a supply conduit (not shown) from a source of a first resin component (designated A) and a second resin component (designated B), engages with the inlets (26A, 26B) to introduce a respective resin component to the first and second conduits respectively.

The rock bolt 12 which, with use of the nozzle 10A of the invention, is resin-anchored, has an elongate body 36 which extends from a distal end (not shown) to a proximal end 38. A resin bore 40 is formed through the rock bolt body. The resin bore opens into a larger diameter cylindrical receptacle 42 which, in turn, opens onto the proximal end.

In use, once the rock bolt has been inserted into a rock hole (not shown) and is ready to be resin-anchored therein, the nozzle 10A with connected supply conduits is engaged with the bolt by inserting the leading end portion 30 of the body into the complementary cylindrical receptacle 42 of the rock bolt. The O-ring seals seal against the walls of the receptacle to seal this engagement.

After connection, resin components, a respective stream of which is designated A and B, can be pumped from their respective sources along the respective supply line conduits to report to the nozzle. The components flow through the respective conduit (22 or 24) of the nozzle, preventing mixing, to be delivered into the resin bore 40 on exiting the respective outlet (28A or 28B).

It is within the resin bore 40 that the resin components (A, B) first come into contact to mix. The resin mixture continues its journey along the bore, exiting the bolt at the distal end to cascade into the annular space between the rock bolt and the rock hole. In this annular space, the resin hardens to adhere to the bolt within the rock hole.

Figure 3:
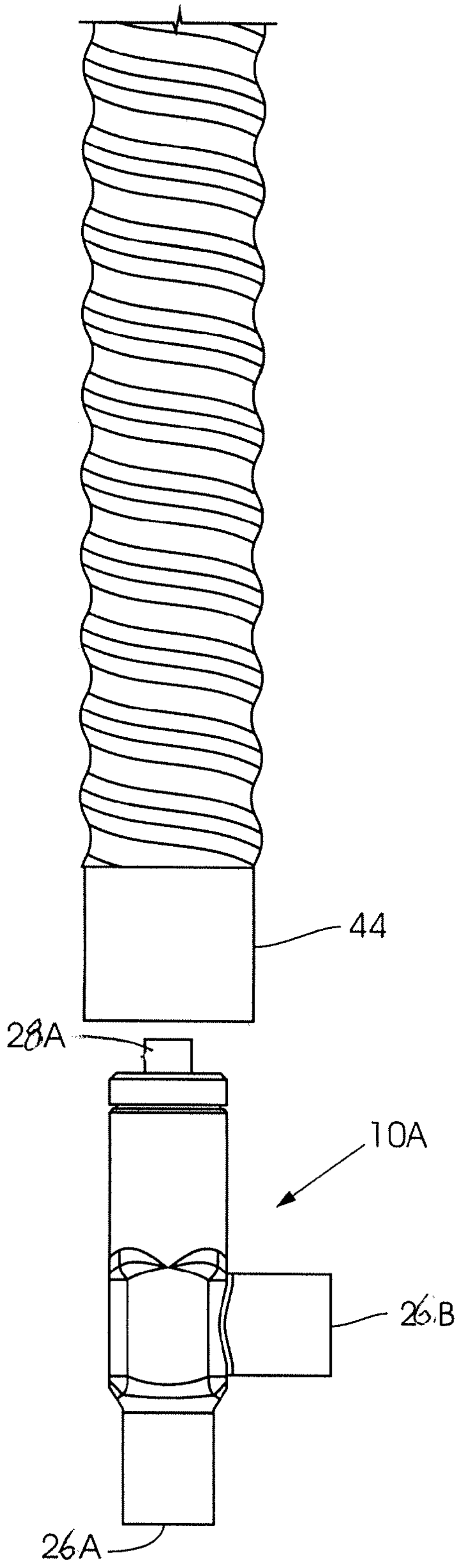
FIG. 3 is a view in elevation of a resin anchored rock bolt, an adapter and a resin input nozzle in accordance with another aspect of the invention.
Figure 4:
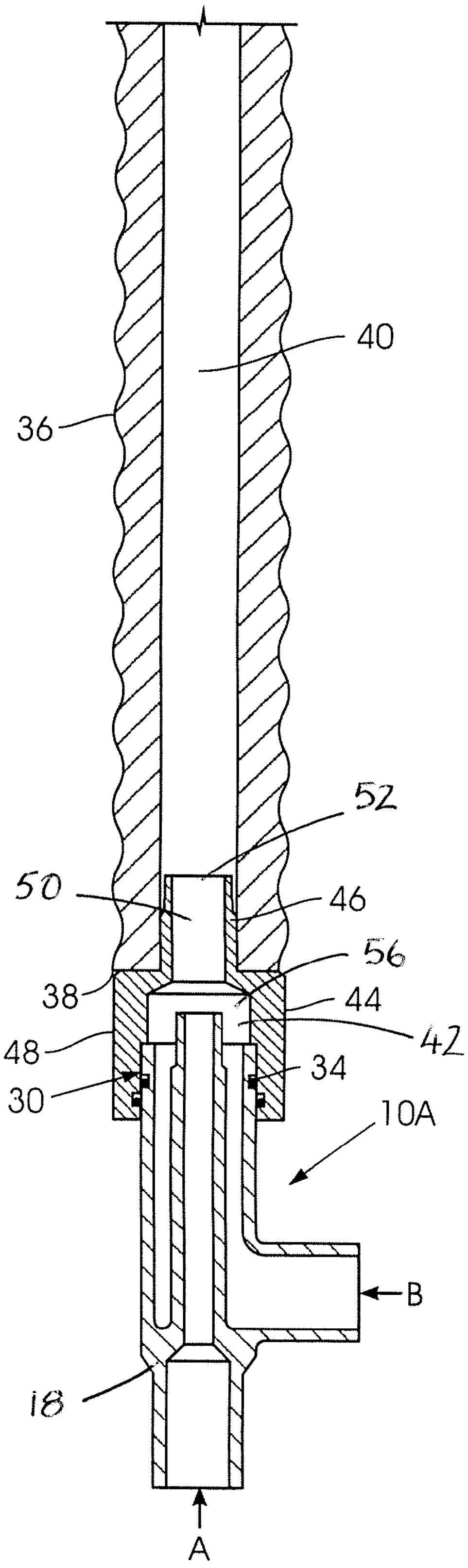
FIG. 4 is a view in longitudinal section of the nozzle connected to the rock bolt with use of the adapter.

In the example represented in FIGS. 3 and 4, instead of the nozzle 10A engaging directly with the rock bolt, connection is achieved via an adapter 44. In this example, the rock bolt 12A is of a standard configuration, without a bespoke porting receptacle 42. The adapter provides the means for connecting the nozzle 10A to such a rock bolt. In describing this aspect, like features bear like designations.

At one end, the adapter 44 is diametrically reduced to provide a nose 46 which is sized to insert into the resin bore 40 from the proximal end 38 of the rock bolt. This leaves a portion 48 of the adaptor axially protruding from the rock bolt 12A, when engaged. At a protruding end of this portion, the adapter provides a receptacle 42. It is into this receptacle that the nozzle fits in sealing engagement as is illustrated in FIG. 4. The receptacle opens into a passage 50 which passes through the nose to an opening 52 at the tip of the nose.

In this example, the nozzle 10A delivers the components into a forward part of the receptacle 42, defining a reservoir 56, before moving through the passage 50, exiting the adapter at the opening 52.

The adapter 44 can be sacrificial, made from a cheap material such as a suitable plastic, in that should any resin harden within adapter, the adapter can be dispensed with and replaced with another.

Figure 5:
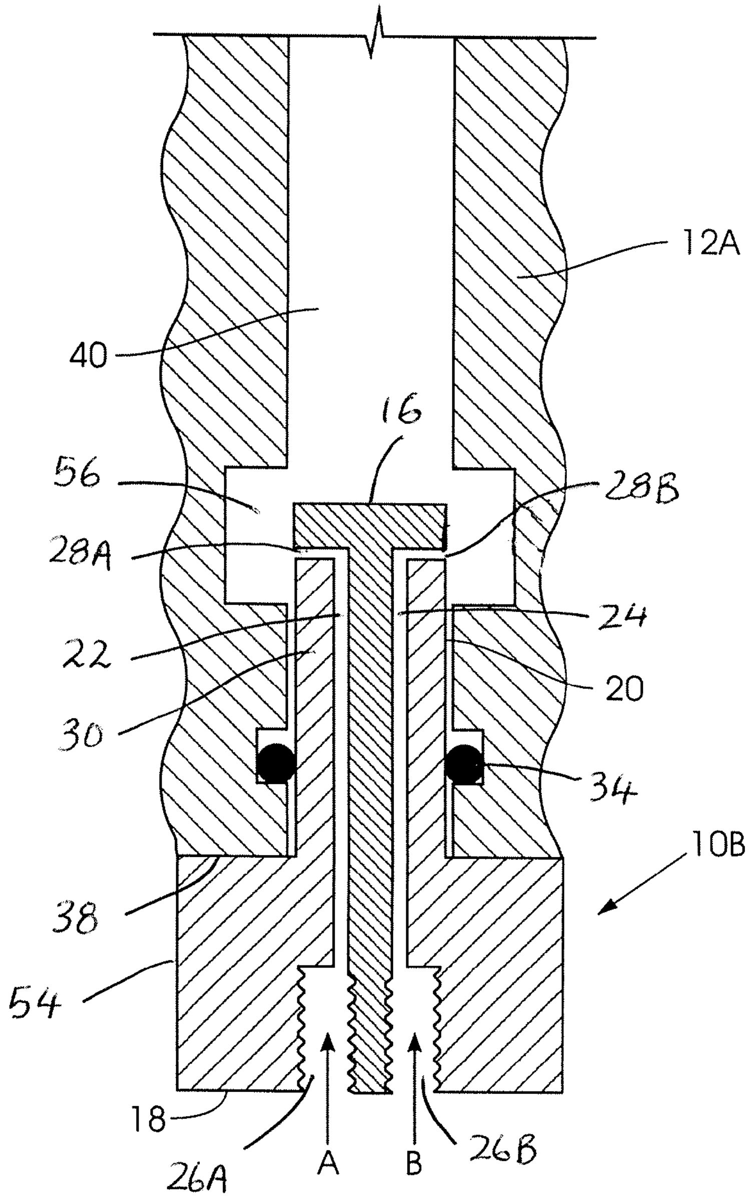
FIG. 5 is a diagrammatic representation of a resin input nozzle in accordance with a second embodiment of the invention.

FIG. 5 illustrates another embodiment of the nozzle 10B. In describing this embodiment, again like features bear like designations and where focus is made on the differences between this embodiment and the nozzle 10A.

The nozzle 10B is unlike nozzle 10A in that does not have a uniformly cylindrical body. Rather, it is more analogous to the adapter 44 in that the nozzle body 14 has a first cylindrical part 54 which, in use, projects from the rock bolt 12B, and a second cylindrical part 30. This latter part is diametrically much reduced, sized to insert into the resin bore 40 from the proximal end 38 of the rock bolt, as would the leading end portion 30 of the nozzle body of the nozzle 10A.

The seal 34, in this example, is not carried on the second cylindrical part 30, but within an annular recess set into the bore 40.

The first conduit 22 and the second conduit 24 extend parallel to one another in the axial direction, with the respective inlets (26A, 26B) recessed into the trailing end 18. The recessed inlets are adapted with threads to threadedly engage terminals of supply conduits of the resin components (A and B).

The conduits (22, 24) do not open directly onto the leading end 16. Instead, towards end 16, each conduit bends at a right angle to continue in opposed lateral directions towards the outer wall 20 surface where each conduit opens at a respective outlet (28A, 28B).

A section of the resin bore 40 of the rock bolt 12B has a reservoir 56 which is formed by an annular rebate in an inner wall of the bore. The positioning of the reservoir, along the bore, is coincident with the length of the second cylindrical part 30 of the nozzle 10B to position the outlets to release the resin components into the reservoir. It is within the reservoir that the components mix.

Like with the earlier embodiment, wherein the outlets are radially spaced (see FIG. 2), in this embodiment, the outlets too are spaced, however they are radially spaced. This spacing of the outlets provides space into which the respective resin components can exit before flowing around the reservoir 54, coming into contact approximately 90° from the outlets, before flowing up the bore. Again, the benefit is realised in that the mixed resin does not harden near the outlets, thus preventing occlusion.

Figure 6:
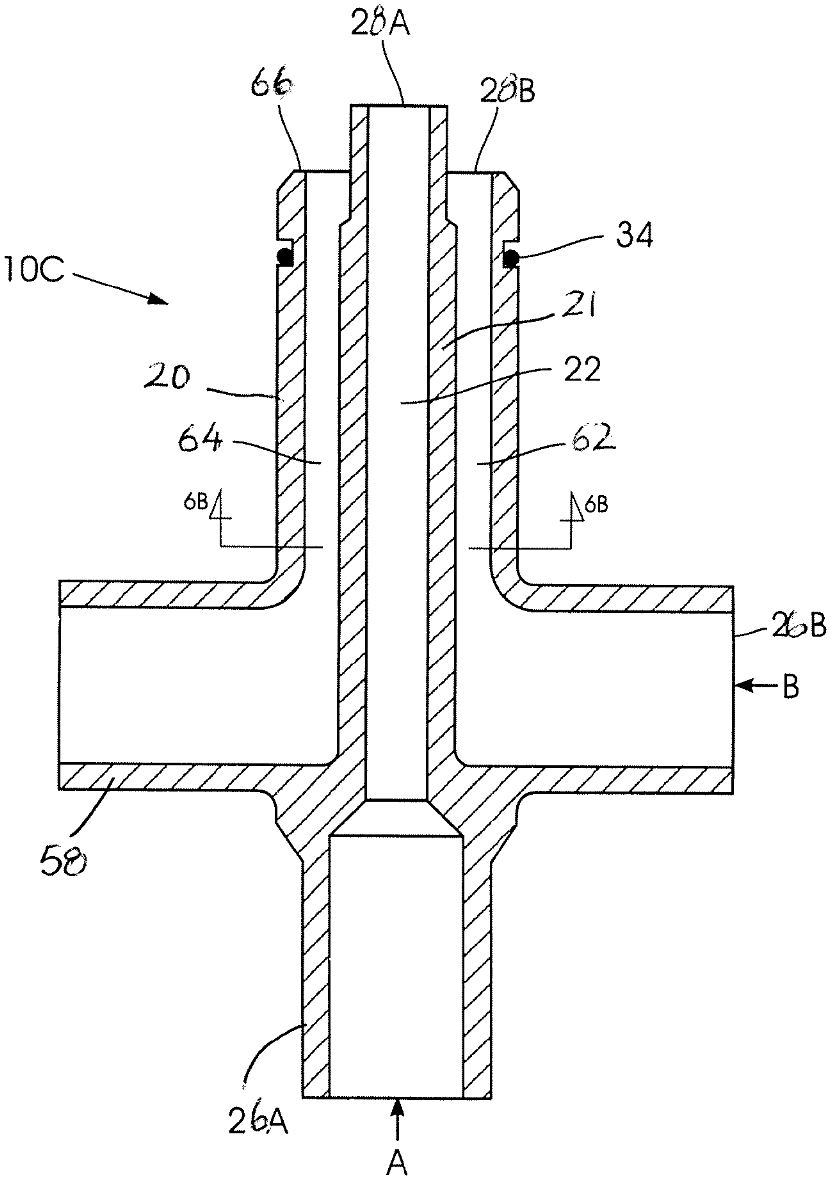
FIG. 6 is a view in longitudinal section of a resin input nozzle in accordance with a third embodiment of the invention.

In another embodiment, illustrated in FIG. 6, the nozzle 10C is similar in configuration to the nozzle 10B in having concentric conduits. However, nozzle 10C has an additional inlet, a flushing fluid or grease inlet 58 which, like inlet 28B, extends laterally, opening through the outer wall 20.

Figure 6B:
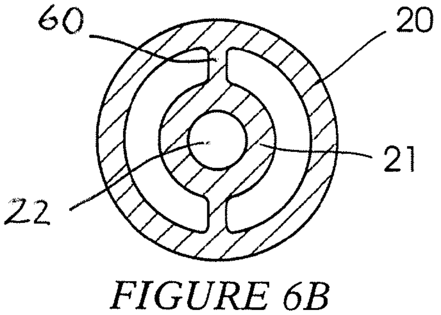

A planar dividing wall 60 (see FIG. 6B) extends between the inner wall 21 and the outer wall 20 in an axial direction, dividing the once circumscribing second conduit 24 into an arcuate resin portion 62 and a flushing portion 64.

The resin conduit opens at the inlet 26B and the outlet 26B. The flushing conduit opens at the grease inlet 58 and the outlet 66.

This nozzle 10C engages with, or connects to, a rock bolt 12 in much the same way as with the nozzle 10A i.e. either directly or indirectly using the adapter 44.

The invention claimed is:

1. A resin input nozzle which is configured to engage or connect to a hollow resin-anchored rock bolt to introduce a resin composed of a plurality of resin components, into and through the bolt, the nozzle comprising:

a body with a leading end, a leading end portion which ends at the leading end, and a trailing end;

a first conduit and a second conduit formed through the body, separate from one another, each of the first and second conduits having an outlet, which opens at or adjacent the leading end; and at least one inlet which is configured to engage with a supply of a respective resin component, wherein the outlets are spaced from one another to prevent mixing of the resin components as each emerges from a respective outlet after passage through a respective one of the first and second conduits by the first and second conduits diverging, at least towards the leading end, with each of the outlets opening through a side-wall of the body, thereby laterally spacing the outlet of the first conduit from the outlet of the second conduit.

2. The resin input nozzle according to claim 1, wherein the body is configured, along the leading end portion, to sealingly engage or connect to the rock bolt.

3. The resin input nozzle according to claim 2, wherein the body includes a sealing formation engaged with the leading end portion.

4. A resin input nozzle kit comprising:

the nozzle according to claim 1; and an adapter which has a forward end, which is configured to engage with an end of the rock bolt, and a rear end which is configured to sealingly engage with the leading end portion of the body of the nozzle.

5. A resin input nozzle kit comprising:

the nozzle according to claim 2; and an adapter which has a forward end, which is configured to engage with an end of the rock bolt, and a rear end which is configured to sealingly engage with the leading end portion of the body of the nozzle.

6. A resin input nozzle kit comprising:

the nozzle according to claim 3; and an adapter which has a forward end, which is configured to engage with an end of the rock bolt, and a rear end which is configured to sealingly engage with the leading end portion of the body of the nozzle.

* * * * *